A. W. EILERS.
SAW STRAIGHTENING DEVICE.
APPLICATION FILED MAR. 20, 1916.
1,208,525. Patented Dec. 12, 1916.
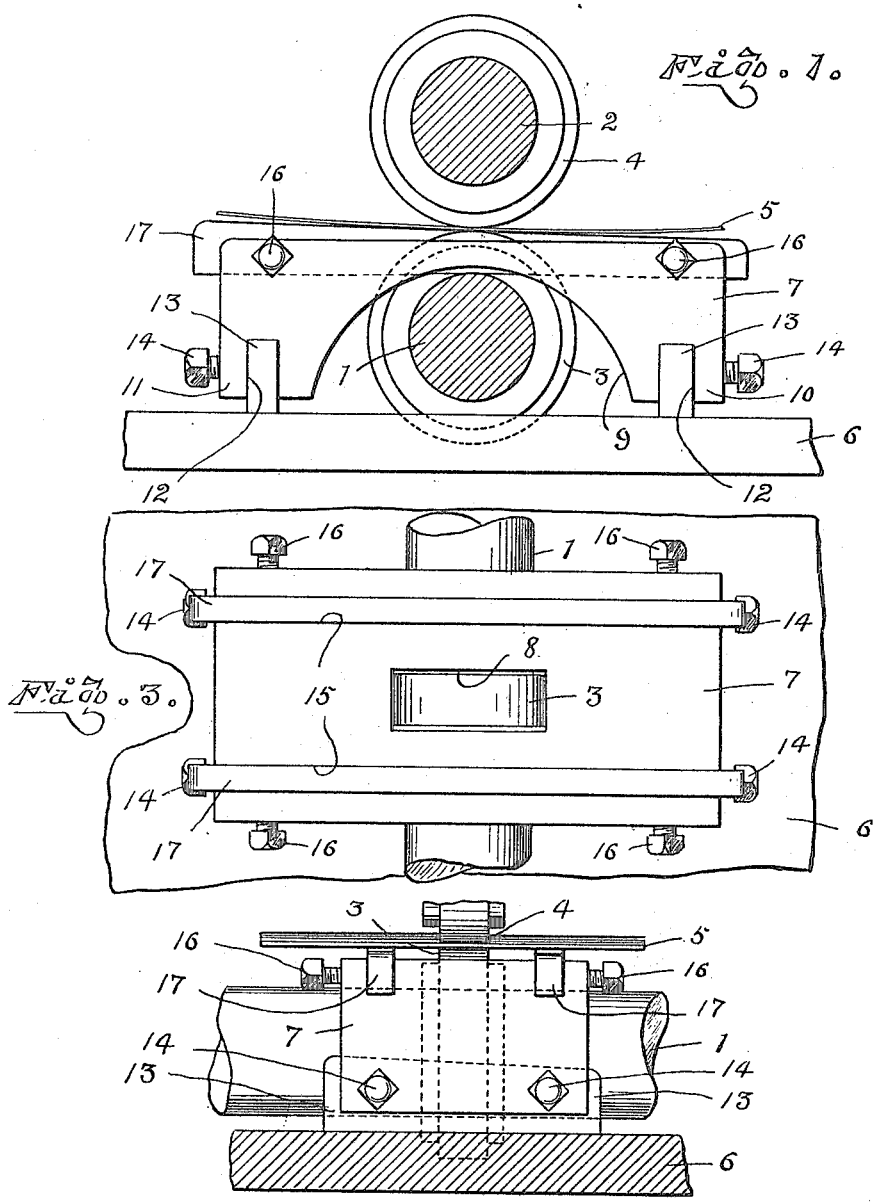
WITNESSES:
J. B. Watts
C. L. Stephens
INVENTOR.
Albert W. Eilers
BY Geo. Stevens
ATTORNEY.

UNITED STATES PATENT OFFICE.

ALBERT W. EILERS, OF CLOQUET, MINNESOTA.

SAW-STRAIGHTENING DEVICE.

1,208,525.  Specification of Letters Patent.  Patented Dec. 12, 1916.

Application filed March 20, 1916. Serial No. 85,353.

*To all whom it may concern:*

Be it known that I, ALBERT W. EILERS, a citizen of the United States, residing at Cloquet, in the county of Carlton and State of Minnesota, have invented certain new and useful Improvements in Saw-Straightening Devices, of which the following is a specification, reference being had therein to the accompanying drawing.

This invention pertains to certain improvements in attachments to saw stretching machines and relates especially to a saw straightening device for such machines whereby a saw may be straightened as well as stretched upon the same machine.

The method of stretching the edges of a band saw by passing it between two metal rollers made to forcibly impinge the same is well known and there are a number of such machines now on the market which perform such work admirably, but in the matter of straightening a saw blade by removing buckles or kinks therefrom, the simple action of the rollers is not sufficient and it is usually the custom to perform such operation by hammering.

The repeated hammering of a saw to straighten it has a tendency to shorten the life of the saw by causing crystallization of the metal and in other ways damaging same.

The object of my present invention is to provide simple means either attachable to or formed a part of the stretching device and by which a saw may be straightened while being stretched and have kinks, twists, buckles or other irregularities removed therefrom, while in the stretching machine.

Other objects and advantages will appear in the further description of the invention.

In the accompanying drawings forming a part of this application and in which like reference characters indicate like parts: Figure 1 is a side elevation of the attachment applied to the lowermost roller of a saw straightening machine. Fig. 2 is an end elevation of same, and, Fig. 3 is a top plan view of the attachment.

1 and 2 represent the roller shafts which are usually found in saw stretching machines, they being arranged in parallelism and made to revolve in any convenient manner at the will of the operator. Upon these shafts and opposed to each other are formed annular enlargements or rollers 3—4, which are designed to engage the saw blade 5 being acted upon and cause sufficient pressure thereupon, when properly adjusted, to stretch the material of which the blade is composed.

The rolls 3 and 4, in relation to the saw blade are quite narrow and are for the purpose of acting upon only a portion of the transverse surface thereof at a time.

A platform or table 6 is usually formed upon such saw stretching machines, the upper surface of which is considerably below a level with the upper extremity of the roll 3. Upon this table and astride the roll 3 my auxiliary platform or table 7 is designed to rest, the upper surface of the auxiliary table being but a slight distance below a level, with the top of the roll, and having an aperture 8, therethrough, through which the roll extends.

The centermost portion of the auxiliary table 7 is cut away or arched as at 9, forming two pedestal portions 10 and 11 and these latter have rectangular shaped channels 12 cut within the faces thereof and into each of which channel is fitted an inclined gib or key 13, held in place by suitable set screws 14—14 tapped through the outermost wall of the pedestal member and engaging the key. By this arrangement of support the height of the auxiliary table 7 may be adjusted to suit different heights of table 6 found in different machines. However it is understood that where the auxiliary table 7 or the equivalent thereof is originally built within the machine, this special form of adjustment would be dispensed with.

Within the upper surface of the auxiliary table 7 and transverse the axis of the roller shafts are formed upon each side of the aperture and some little distance therefrom a channel 15 into each of which is removably fitted a tapered or inclined gaging member, 17, held in place by suitable set screws 16 tapped into engagement therewith through the side walls of the table 7. Thus the members 17—17 may be adjusted longitudinally to raise or lower their upper saw blade engaging surface to any desired plane in relation to the uppermost surface of the roll 3 or in the event of taking a twist out of the saw blade, one of the gaging members may be changed end for end that the extreme in the elevation of the ends of the members may be diagonally opposite in order to bring the proper strain upon the saw as it is passed through the rolls.

Having a vertically adjustable gaging surface upon each side of the rolls for the saw to bear upon makes it possible to force therefrom to a nicety most any degree of buckle, twist or kink; whereas were there no side bearings for the blade the extent of lateral adjustment to the saw could not be successfully regulated, and therefore hammering would have to be resorted to.

Having thus described my invention what I claim as new and desire to secure by Letters Patent is:

1. The combination with a saw stretching machine having a pair of saw engaging rolls and a table adjacent the rolls, of an adjustable auxiliary table astride the lowermost roll and an adjustable saw gaging member carried by the auxiliary table.

2. The combination with a saw stretching machine having a pair of coöperating rollers therein, of a table surrounding the lowermost roller and below a plane with the uppermost face of said roller, channels being formed within the uppermost face of the table and upon both sides of the roller, inclined gaging members slidably carried within said channels and means for holding said gaging members in a predetermined location.

In testimony whereof I hereunto affix my signature in the presence of two witnesses.

ALBERT W. EILERS.

Witnesses:
  VICTOR ANDERSON,
  S. GEO. STEVENS.

Copies of this patent may be obtained for five cents each, by addressing the "Commissioner of Patents, Washington, D. C."